(12) United States Patent
Schnaase et al.

(10) Patent No.: US 11,466,738 B2
(45) Date of Patent: Oct. 11, 2022

(54) METHOD AND DEVICE FOR ASCERTAINING A POSITIONAL DEVIATION OF A BRAKE DISC

(71) Applicant: Ferquest GmbH, Velbert (DE)

(72) Inventors: Rene Schnaase, Velbers (DE); Jens Weihrauch, Weyhe (DE)

(73) Assignee: Ferquest GmbH, Velbert (DE)

( * ) Notice: Subject to any disclaimer, the term of this patent is extended or adjusted under 35 U.S.C. 154(b) by 270 days.

(21) Appl. No.: 16/623,812

(22) PCT Filed: Jan. 3, 2018

(86) PCT No.: PCT/DE2018/100001
§ 371 (c)(1),
(2) Date: Dec. 18, 2019

(87) PCT Pub. No.: WO2019/001605
PCT Pub. Date: Jan. 3, 2019

(65) Prior Publication Data
US 2020/0207325 A1   Jul. 2, 2020

(30) Foreign Application Priority Data

Jun. 28, 2017 (DE) .......................... 102017114378.5

(51) Int. Cl.
*F16D 65/00* (2006.01)
*B60T 17/22* (2006.01)
(Continued)

(52) U.S. Cl.
CPC ........ *F16D 65/0043* (2013.01); *B60T 17/221* (2013.01); *G01B 7/023* (2013.01);
(Continued)

(58) Field of Classification Search
CPC ............. G01N 3/56; G01N 2203/0226; G01N 2203/023; F16D 65/0043; F16D 65/12;
(Continued)

(56) References Cited

U.S. PATENT DOCUMENTS

| | | | | |
|---|---|---|---|---|
| 5,970,427 A | * | 10/1999 | Greenwald | G01B 21/08 33/610 |
| 6,233,533 B1 | * | 5/2001 | Xu | G01R 31/302 701/70 |
| 6,427,346 B1 | * | 8/2002 | Stieff | G01B 21/26 33/203.18 |
| 7,222,521 B1 | * | 5/2007 | Smith | G01B 5/0028 73/121 |
| 7,437,917 B1 | * | 10/2008 | McNaughton | G01B 7/08 73/121 |

(Continued)

FOREIGN PATENT DOCUMENTS

| | | | | |
|---|---|---|---|---|
| DE | 10132968 A1 | * | 1/2003 | ............ B60T 17/221 |
| JP | 01136011 A | * | 5/1989 | |

(Continued)

OTHER PUBLICATIONS

Translation JP-01136011-A (Year: 1987).*

*Primary Examiner* — Alexander A Mercado
*Assistant Examiner* — Monica S Young
(74) *Attorney, Agent, or Firm* — Michael Soderman

(57) ABSTRACT

The invention relates to a method and an apparatus for ascertaining a positional deviation of a brake disc (30) relative to a caliper seat (11). According to the invention, an angular deviation (34) from the parallel between the brake disc (30) and the caliper seat (11) is measured in that an apparatus (1) for ascertaining the positional deviation of the brake disc (30) is connected to the caliper seat (11), the apparatus (1) comprising at least two distance sensors (20, 22) that are stationary with respect to the caliper seat (11) and take measurements in the direction of a first flat face of the brake disc (30), the distance sensors (20, 22) transmitting distances (A, A') between the first flat face of the brake disc (30) and the distance sensors (20, 22) measured at different radii (R, R') of the brake disc (30) to an evaluation device, (Continued)

the angular deviation (34) of the brake disc (30) being ascertained by the evaluation device from the distances.

14 Claims, 6 Drawing Sheets

(51) Int. Cl.
  *G01B 7/02* (2006.01)
  *G01B 7/31* (2006.01)
  *G01B 11/27* (2006.01)
  *F16D 65/12* (2006.01)
  *G01B 11/02* (2006.01)

(52) U.S. Cl.
  CPC .............. *G01B 7/31* (2013.01); *G01B 11/272* (2013.01); *F16D 65/12* (2013.01); *G01B 11/026* (2013.01)

(58) Field of Classification Search
  CPC ......... B60T 17/221; G01B 7/023; G01B 7/31; G01B 11/272; G01B 11/026; G01B 21/08
  USPC .................................................................. 73/7
  See application file for complete search history.

(56) References Cited

U.S. PATENT DOCUMENTS

| | | | | |
|---|---|---|---|---|
| 7,716,974 | B2* | 5/2010 | Kitchen | ................. G01B 21/08 73/121 |
| 2003/0111305 | A1* | 6/2003 | Drennen | ................ F16D 65/095 188/73.44 |
| 2009/0320579 | A1* | 12/2009 | Ante | ........................ F16D 55/22 73/121 |
| 2012/0198926 | A1* | 8/2012 | Baumgartner | .......... F16D 66/00 73/132 |
| 2014/0352417 | A1* | 12/2014 | Iwahashi | .............. G01B 11/306 73/129 |
| 2019/0225202 | A1* | 7/2019 | Juzswik | ................... B60T 17/18 |

FOREIGN PATENT DOCUMENTS

| | | |
|---|---|---|
| JP | 06201305 A | 7/1994 |
| JP | 2008020317 A | 1/2008 |
| JP | 2009092435 A | 4/2009 |
| WO | 99/63353 A1 | 12/1999 |
| WO | WO-9963353 A1 * | 12/1999 ........... G01R 31/302 |

* cited by examiner

METHOD AND DEVICE FOR ASCERTAINING A POSITIONAL DEVIATION OF A BRAKE DISC

CROSS REFERENCE TO RELATED APPLICATIONS

This application is the U.S. national stage of International Application No. PCT/DE2018/100001, filed on Jan. 3, 2018. The international application claims the priority of DE 102017114378.5 filed on 2017 Jun. 28; all applications are incorporated by reference herein in their entirety.

BACKGROUND

The invention relates to a method and an apparatus for ascertaining a positional deviation of a brake disc relative to a caliper seat. The brake disc constitutes a flat rotational body capable of rotating about a rotation axis and having two opposed rotational surfaces, wherein the rotational surfaces are to run parallel to a reference surface, i.e. the caliper seat.

A special challenge in the field of the invention consists in the fact that, although various geometrical and positional tolerances of the assembled components add up to a unitary error pattern, the causes are nevertheless to be ascertained and analyzed separately.

An important error to be ascertained is a deviation from the perpendicularity between the rotation axis of the brake disc and the caliper seat, said error corresponding to at least an average deviation of the parallelism of the caliper seat and the brake disc. For better differentiation, this positional deviation will hereinafter be referred to as axial perpendicularity.

Furthermore, the current angle between the rotating surface and the immobile reference surface may vary during the rotation if there is a deviation in the perpendicularity between the rotating surface and the rotation axis and thus a disc runout.

A runout related error may be caused not only by tolerances regarding the planarity of the measured flat face but also by the parallelism of the two flat faces of the brake disc relative to one another, which will hereinafter be referred to as surface parallelism for better differentiation. Deviations thereof result in a varying thickness along the circumference and at various radii of the rotating object.

All the aforesaid positional tolerances, i.e. axial perpendicularity, disc runout and surface parallelism, are closely interrelated; for better understanding, refer to FIGS. 12a, 12b and 12c, which schematically illustrate axial perpendicularity, disc runout and surface parallelism, respectively.

It is therefore difficult to ascertain one of these positional tolerances separately, in particular after various tolerances have added up in the assembled overall system. However, an exceedance of the tolerances is highly disadvantageous since the position of the brake disc relative to the caliper seat is important. Otherwise, a non-uniform transfer of the forces occurring during braking into the caliper, the caliper seat and ultimately the axle results causing undesired vibrations in the overall system.

Various solutions are known from the prior art which address the problem of measuring a brake disc. For example, German patent publication no. DE 198 53 078 C1 describes a measuring device and a method for simplified inspection of brake discs for disc runout and concentricity. For this, a shaft is rotatably supported on a bearing block, and a support for the brake disc is provided on the shaft. Mounted in this manner, the brake disc is rotated while disc runout and concentricity are checked on both flat faces and the outer cylinder surface using measuring devices. However, this inspection only yields results related to the brake disc itself. Proper concentricity or runout with respect to a further surface, such as a caliper seat, are not provided. Moreover, no further values are ascertained besides concentricity and runout.

Published German patent application no. DE 10 2011 002 924 A1 likewise relates to a method for identifying brake disc runout during braking. In this respect, this method is already closer to the practical use of the brake disc than the method cited above. This is because the braking pressure, or a variable dependent thereon, is measured during a braking operation using a sensor. The obtained sensor signal is then examined with respect to vibrations present therein. These vibrations then allow inferences regarding disc runout, which, however, does not necessarily originate from the brake disc itself. The error may also lie in the overall mounting system of the brake disc. A reference to a surface which is immobile relative to the rotating system, i.e. the brake disc, is thus established. However, the proposed method cannot ascertain any further information but is limited exclusively to an essentially qualitative statement with respect to disc runout. More importantly, however, the identified problems cannot be traced back distinctly to a mechanical malposition of the brake disc.

SUMMARY

The invention relates to a method and an apparatus for ascertaining a positional deviation of a brake disc (30) relative to a caliper seat (11). According to the invention, an angular deviation (34) from the parallel between the brake disc (30) and the caliper seat (11) is measured in that an apparatus (1) for ascertaining the positional deviation of the brake disc (30) is connected to the caliper seat (11), the apparatus (1) comprising at least two distance sensors (20, 22) that are stationary with respect to the caliper seat (11) and take measurements in the direction of a first flat face of the brake disc (30), the distance sensors (20, 22) transmitting distances (A, A') between the first flat face of the brake disc (30) and the distance sensors (20, 22) measured at different radii (R, R') of the brake disc (30) to an evaluation device, the angular deviation (34) of the brake disc (30) being ascertained by the evaluation device from the distances.

DETAILED DESCRIPTION

The object of the present invention is thus to propose a method and an apparatus for ascertaining a positional deviation, including ascertaining at least an axial perpendicularity of a brake disc with respect to a caliper.

The object is achieved by a method for ascertaining a positional deviation of a brake disc relative to a caliper seat. According to the invention, an angular deviation from the parallel between the brake disc and the caliper seat is measured, wherein at least axial perpendicularity and disc runout contribute to the angular deviation. Said measuring is done by connecting an apparatus for ascertaining the positional deviation of the brake disc to the caliper seat. Accordingly, axial perpendicularity and disc runout can initially be measured together via an angular deviation from the parallel between the brake disc and the caliper seat. For this, the apparatus comprises at least two distance sensors which are stationary with respect to the caliper seat and preferably take measurements perpendicular to and in the direction of a first flat face of the brake disc. The distance sensors transmit distances between the first flat face of the brake disc and the distance sensors measured at different radii of the brake disc, i.e. at distances from its rotation axis, to an evaluation device. In the evaluation device, the angular deviation of the brake disc is ascertained from the measured distances.

According to a preferred modified embodiment of the invention, the brake disc is rotated during the measurement. This enables ascertainment of the change in the angular deviation as a function of the rotation angle of the brake disc, and thus the disc runout.

The angular deviation constitutes the current or average deviation of the rotating surface, in this case the brake disc, from the position of the immobile reference surface, in this case the caliper seat, during its rotation. The angular deviation is based on a target angle. The target angle is 0° since the requirement is parallelism.

The rotation angle dependent angular deviation is determined by evaluating distances from the brake disc measured during the rotation of the brake disc. Based on the rotation angle dependent angular deviation, i.e. by considering the respective rotation angle of the brake disc about the rotation axis, the evaluation device can separately calculate and output the axial perpendicularity from an average angular deviation, and a disc runout from the change in the angular deviation during a rotation.

Due to the fact that the positional deviation, in particular the axial perpendicularity of the brake disc and also the disc runout relative to the reference surface, remain within specified tolerances, and this can be checked in a quick and effective manner, the functional reliability of the respective applications is improved considerably. After all, in the case of a disc brake, too large deviations in the orientation relative to the caliper result in undesired vibrations once the brake is actuated and the brake pads rest against the brake disc. With the method according to the invention, an ascertainment as to whether tolerances have been exceeded can already be made prior to the installation of the steering knuckle assembly or the axle assembly. In such a case, the defective assembly is not even installed but is immediately reworked until the specified tolerances are met. Expensive reworks on the completed vehicle or complaints are thus prevented.

Moreover, at least one further distance sensor is provided which is oriented towards a second flat face of the brake disc. If an evaluation device combines the measured values of this sensor with those of a sensor directed towards the first flat face, the surface parallelism of the brake disc can additionally be ascertained, and thickness variations can be determined.

According to a preferred application of the present invention, a brake disc of a disc brake mounted to a steering knuckle assembly or an axle assembly is provided as the brake disc, and the brake disc is to be examined as to axial perpendicularity, disc runout and surface parallelism of the brake disc relative to the caliper seat.

According to the invention, the plane of the caliper seat, which accordingly constitutes a reference surface, is projected to the tilting point at the rotation axis.

Accordingly, configurations are advantageous in which first distance sensors are arranged to act on a first flat face and/or second distance sensors are arranged to act on a second flat face of the brake disc. In advantageous configurations, at least three distance sensors are provided, at least two of them for acting at a flat face of the brake disc, which sensors are rigidly attachable to the caliper seat and can provide a measurement result to an evaluation device during rotation of the brake disc. The measurement during rotation of the brake disc provides the possibility of ascertaining the maximum malposition, whereas in the case of conventional measurements in a stationary state only the current angular deviation present in the respective position of the brake disc can be ascertained if a disc runout exists. An arrangement comprising three and two, and thus a total of five distance sensors, is particularly preferred.

According to an advantageous modification of the invention, in particular also the apparatus, at least one distance sensor is provided as a laser measuring sensor. Other distance measuring techniques, such as radar beams, may be considered as alternatives.

However, configurations in which at least one distance sensor is provided as a capacitive proximity sensor have proven to be particularly advantageous. This also allows, for example, measuring brake discs made of ceramics. Also, this results in extremely high precision, enabling measurements of deviations down to 10 nm. In addition, a capacitive proximity sensor only requires very little installation space, so that the size of the overall apparatus can be reduced considerably.

A further aspect of the invention relates to an apparatus for ascertaining a positional deviation of a brake disc relative to a caliper seat. According to the invention, a connection region which is configured for connection with the caliper seat, and at least two distance sensors which are stationary with respect to the caliper seat are provided. The distance sensors are arranged at different radii with respect to the rotation axis of the brake disc and are configured for measuring a distance between a first flat face of the brake disc and the distance sensors, preferably perpendicular to the caliper seat and in the direction of the first flat face of the brake disc. Further, an evaluation device is provided which is connected to the distance sensors in such a manner that the measured distance can be transmitted to the evaluation device and the angular deviation of the brake disc can be ascertained from said distance.

The evaluation device is configured such that it can additionally ascertain a surface parallelism of the brake disc if a third distance sensor is used on the opposite second flat face.

According to a particularly advantageous embodiment, at least three distance sensors are arranged to act on the first flat face, e.g. an inner side, and two distance sensors are arranged to act on the second flat face, e.g. an outer side, of the brake disc. With five distance sensors, brake discs having various diameters can be inspected on one measuring device by activating or sampling, by the evaluation device, the sensors that are positioned closest to the edge of the respective brake disc. The distance sensor closest to the edge preferably has a distance of 10 mm from the edge of the brake disc. Further, configurations in which the measuring direction runs perpendicular to the caliper seat have proven to be beneficial.

Advantageously, at least one distance sensor is configured as a laser measuring sensor or as a radar beam emitter. Configurations in which at least one distance sensor is configured as a capacitive proximity sensor are particularly advantageous. This also allows measuring brake discs made of ceramics. Also, this results in extremely high precision, enabling measurements down to 10 nm. In addition, a capacitive proximity sensor only requires very little installation space, so that the size of the overall apparatus can be reduced considerably.

Further advantages result from configurations in which a plurality of distance sensors is provided to act on the inner side and a plurality of distance sensors is provided to act on the outer side of the brake disc.

Also, configurations have proven to be advantageous in which separate embodiments are provided for a continuous axle, i.e. an axle assembly, and individual wheel suspensions, i.e. a steering knuckle assembly, respectively. In the case of a continuous axle, in particular a rear axle, the entire axle unit is inserted into the apparatus according to the invention, whereas in the case of individual wheel suspensions the steering knuckle assembly of each vehicle side is inserted into the apparatus and connected to the housing carrying the distance sensors separately. A separate apparatus, i.e. a separate housing, is preferably provided for each vehicle side, and a separate apparatus is respectively provided for the steering knuckle assembly or the axle assembly of the right or the left side.

A contribution in achieving the object according to the invention is further made by a calibrating device which includes a master adjuster comprising a planar surface dimensionally accurate to the required tolerance limits and parallel to the orientation of the brake disc, and which can be connected to the apparatus as described above. This enables adjustment of the distance sensors and/or the connected evaluation device. A measurement standard, configured as a dimensionally accurate brake disc or a modifiable device for simulating brake discs of different sizes, serves to examine the master adjuster and the entire apparatus.

Configurations have proven particularly beneficial in which the master adjuster is connected to the apparatus as described above in an actively movable manner such that it can be pivoted with its measuring standard surface into the measuring area automatically and the apparatus can be calibrated. This is done, for example, in regular time intervals and/or depending on external factors such as shocks or temperature changes. Such an automatable calibrating function is particularly important where the apparatus is employed within a largely automated production environment in series production.

A further aspect of the invention thus relates to a calibrating method for calibrating the apparatus according to the invention as described above, and thus for ensuring constantly correct measurement results.

A typical and exemplary examination procedure is as follows:
1. The operator places the apparatus, which is configured as "left measuring unit", on the receiving surface of the caliper and screws it on.
2. In the measuring program, the operator selects "angular position measurement" on the screen. The measuring program, which runs on the evaluation device, retrieves the values from the laser sensors and calculates the two angular positions. The angles are optionally output on the screen.
3. The operator then selects "surface parallelism measurement". The operator manually rotates the brake disc through 360 degrees, which may alternatively be done by a drive. The retrieval is done, for example, via an initiator. Once the rotation has completed 360 degrees, the results are output on the screen. The measuring program indicates the difference between the minimum and maximum values. This is done at two points on the inner side and at two points on the outer side.
4. The operator demounts the measuring unit and places it on the trolley in its rest position.

The examination procedure is then repeated on the right side.

Instead of using a brake disc with unknown inherent runout of the two flat faces or the surface parallelism, the measuring accuracy may be increased if a standardized brake disc is used which has reduced runout tolerances or has known rotation angle dependent dimensional deviations in its runout. The rotation angle dependent dimensional deviations in runout for each flat face, and, if applicable, also the surface parallelism, are stored in the evaluation device and are included in the calculation.

Alternatively, each brake disc may be measured after fabrication, and its individual topography may be stored. In this case, it is not necessary to attach a mark for the rotation angle dependent measurement since the individual topography is suitable not only for identification of the brake disc but also for the unambiguous assignment of the respective rotation angle.

Moreover, the registration of the individual topography also allows the identification of counterfeit articles when the individual topography is inconsistent with the other data provided on the brake disc.

The calibration of the apparatus for ascertaining a positional deviation includes an exemplary procedure which involves the following steps:
1. The operator places the connection region of the apparatus for ascertaining a positional deviation of a brake disc on the connection seat of the master adjuster and screws it on.
2. In the measuring program of the evaluation device, the operator selects "calibration" on the screen. The measuring program calibrates the distance sensors.
3. The operator demounts the measuring unit and places it in its rest position.

The invention is explained in more detail below by way of a description of exemplary embodiments and their illustration in the corresponding drawings.

DETAILED DESCRIPTION OF THE PREFERRED EMBODIMENTS

Figure 1:
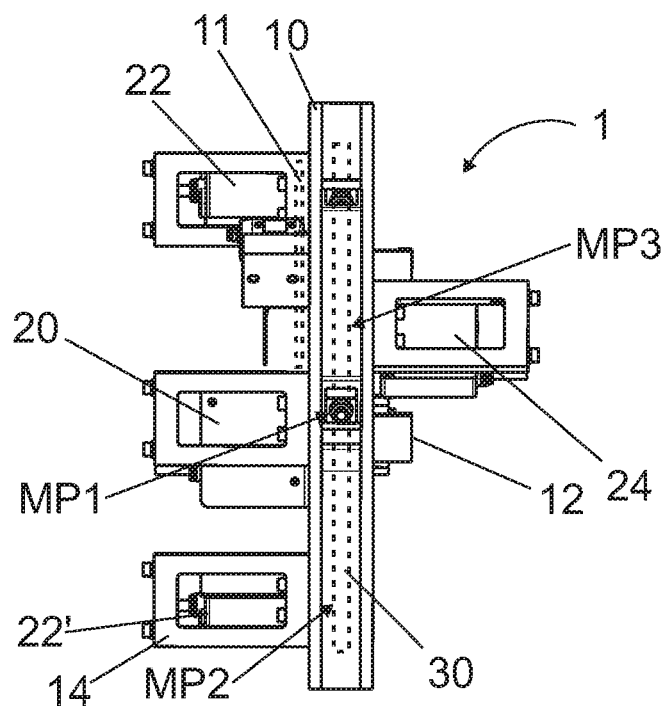
FIG. 1 shows a schematic side view of an embodiment of an apparatus according to the invention for ascertaining a positional deviation of a brake disc, illustrating the position of a brake disc capable of rotating about a rotation axis relative to a caliper seat.

FIG. 1 shows a schematic side view of an embodiment of an apparatus 1 according to the invention for ascertaining a positional deviation of a brake disc 30. Also shown are the position of the brake disc 30 capable of rotating about a rotation axis relative to a reference surface connected to the housing 10, i.e. the caliper seat 11, and the caliper seat 11 itself. Both are illustrated as invisible edges using dashed lines as they are covered by the housing 10. The housing 10 of the apparatus 1 is connected to the caliper seat 11 in an immobile and releasable manner via a connection region 12, preferably through a threaded connection or through bracing using bracing means.

The measuring points MP1, MP2 and MP3 on the brake disc 30 are measured by the distance sensors 20, 22 and 24. The distance sensors 20, 22 and 24 are each fixedly connected to the housing 10 using a respective sensor holder 14.

In addition to the distance sensor 22, a distance sensor 22' is provided, both acting on a first flat face of the brake disc 30. Which one of the two distance sensors is used in a particular case depends on the diameter of the brake disc 30 since the measurement at the measuring point MP2 is to be performed near the outer circumference, for example at a distance of 10 mm from the edge. The measured values are transmitted to an evaluation device 40 (see FIG. 5).

Figure 2:
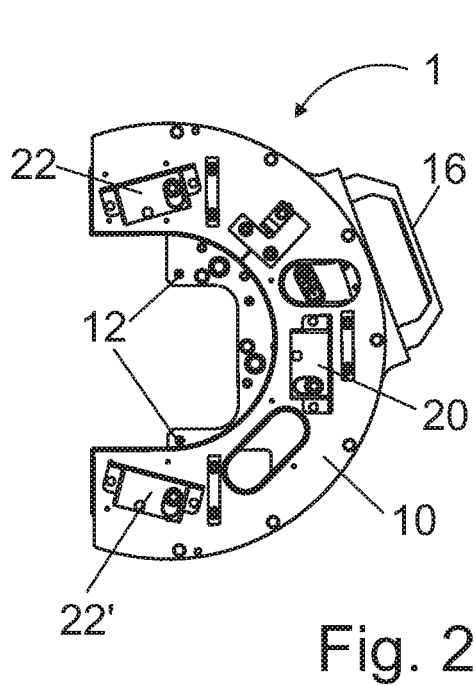
FIG. 2 shows a schematic front view of an embodiment of an apparatus according to the invention for ascertaining a positional deviation of a brake disc.

FIG. 2 shows a schematic front view of an embodiment of an apparatus 1 according to the invention for ascertaining a positional deviation of a brake disc, in which the sensors 20 and 22 and 22', respectively, are shown on the housing 10. The housing 10 is further provided with a handle 16 to facilitate the transport of the apparatus 1 to the point of installation. Once the apparatus 1 has been positioned at the point of installation, in particular a steering knuckle assembly or axle assembly and its caliper seat, the connection between the caliper seat and the apparatus 1 is established via at least one connection region 12. During this process, the orientation of the caliper seat is transmitted via the connection region 12 and the housing 10 to the distance sensors 20, 22 and 24, and their orientation relative to the caliper seat is determined.

As can be seen in the illustration, the connection region 12 has numerous boreholes. It is thus suitable for use with different axle assemblies or steering knuckles, in particular the caliper seat respectively provided there.

Figure 3:
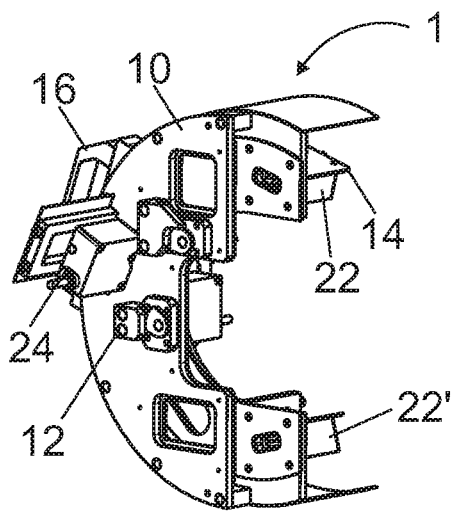
FIG. 3 shows a schematic perspective view of an embodiment of an apparatus according to the invention for ascertaining a positional deviation of a brake disc.

FIG. 3 shows a schematic perspective view of an embodiment of an apparatus 1 according to the invention for ascertaining a positional deviation of a brake disc, with the illustrated embodiment corresponding to that of FIG. 2. The perspective illustration again shows the housing 10 with the handle 16 as well as the sensor holders 14 with the distance sensors 22, 22' and 24. The connection region 12 serves to connect to the caliper seat 11, in the present case the caliper seat of the steering knuckle assembly or the axle assembly.

Figure 4:
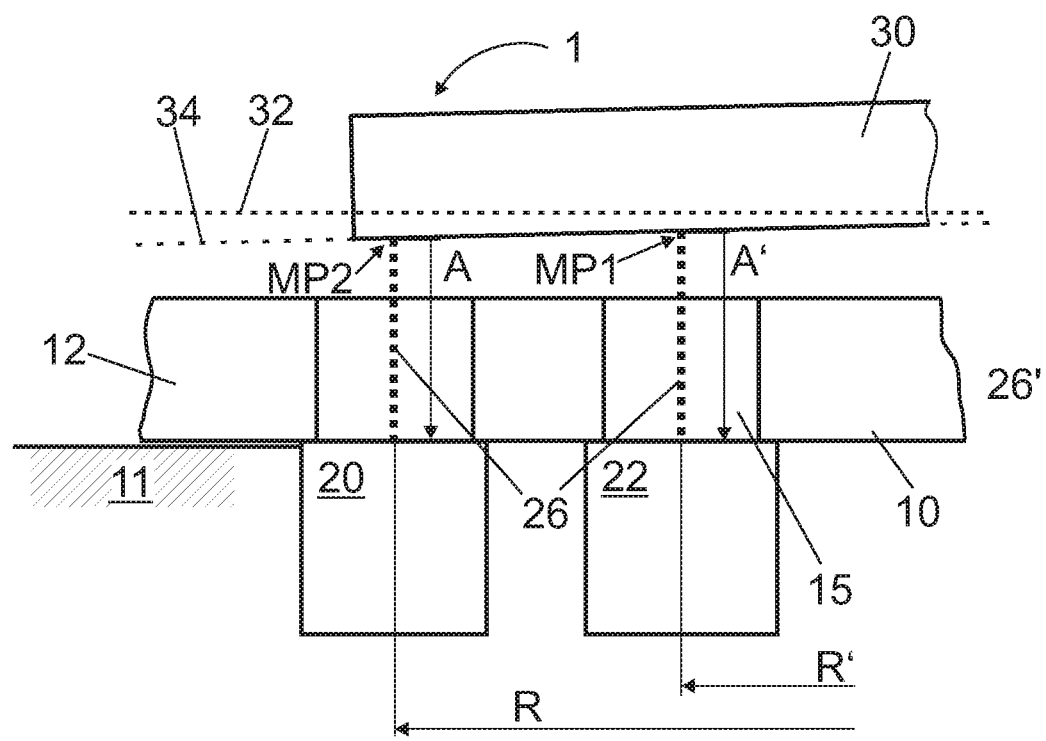
FIG. 4 shows a schematic illustration of the function of an apparatus according to the invention for ascertaining a positional deviation of a brake disc.

FIG. 4 shows a schematic illustration of the function of an apparatus 1 according to the invention for ascertaining a positional deviation of a brake disc 30. The illustration shows only a section of the brake disc, which does not include its rotation axis. The brake disc 30 is inclined relative to a zero line 32, which runs parallel to the caliper seat and represents a standard position, by an angular deviation 34. To ascertain the magnitude of the angular deviation 34 and to determine whether a provided tolerance range is exceeded, a distance A, A' from a first flat face of the brake disc 30 is ascertained by the distance sensors 20 and 22 at two different measuring points MP1 and MP2. This is done using a sensor signal 26 and 26', respectively, emanating from the distance sensors 20, 22 and 22', respectively, which is directed towards the brake disc 30. Passing through the housing 10, which is provided with recesses 15 to this end, the sensor signal 26, 26' reaches the brake disc 30 at the measuring points MP1 and MP2. The housing 10 is connected to the caliper 11 through the connection region 12. The distance sensors 20 and 22, or the measuring points MP1 and MP2, are arranged at different distances, i.e. the radius R, R', from the rotation axis of the brake disc 30.

For a clear association of the ascertained angular deviation 34 with an actual angular deviation of the rotation axis from the perpendicular to the caliper seat 11 (zero line 32), it is not sufficient to ascertain the angular deviation only at two separate measuring points MP1, MP2. In view of this, the brake disc 30 is rotated about its rotation axis at least once and preferably multiple times during the measurement. During this process, the evaluation device 40 (see FIG. 5) receives not only the measured values from the distance sensors 20, 22 and 22', respectively, but also the current rotation angle at the time of the distance measurement, which is transmitted, for example, from a drive of the brake disc 30 or a rotation angle sensor. The rotation angle sensor used may be, for example, a dummy wheel rim which is installed on the brake disc at the position of a wheel rim to be installed in the vehicle at a later point. To this end, it is provided with suitable circumferential marks that can be read out by the rotation angle sensor. In the simplest case, the five screws may be used as marks.

A measuring program executed in the evaluation device 40 retrieves the measured values of the respective distances from the brake disc via the sensors 20, 22 and 22', respectively, and 24 if available and, based thereon and on the rotation data, i.e. the rotation angle of the brake disc, which is another measured value, calculates the angular deviations of the brake disc relative to the caliper seat 11 and the disc runout, i.e. the angular misalignment of the brake disc 30 relative to its rotation axis. In this manner, comprehensive information about the condition of the brake disc 30 in terms of axial perpendicularity, disc runout and surface parallelism relative to the caliper seat 11 of the steering knuckle assembly 38 or the axle assembly 36 can be obtained through ascertainment of the rotation angle dependent angular deviation 34.

To also obtain information about the surface parallelism of the brake disc 30, a distance sensor 24, which is not illustrated here, measuring a measuring point MP3 is provided on the opposite flat face of the brake disc 30. This sensor is, for example, arranged directly opposite the measuring point MP2, so that this also allows the evaluation device 40 to evaluate the measured values from the measuring points MP2 and MP3 in such a manner that deviations in surface parallelism, i.e. the thickness of the brake disc, can be determined along the entire circumference at least in the region of the measuring points. Advantageously, two distance sensors for the measuring point MP2 are then accordingly opposed by two corresponding distance sensors for the measuring point MP3. Additional distance sensors will provide an even more accurate picture of the surface parallelism.

Figure 5:
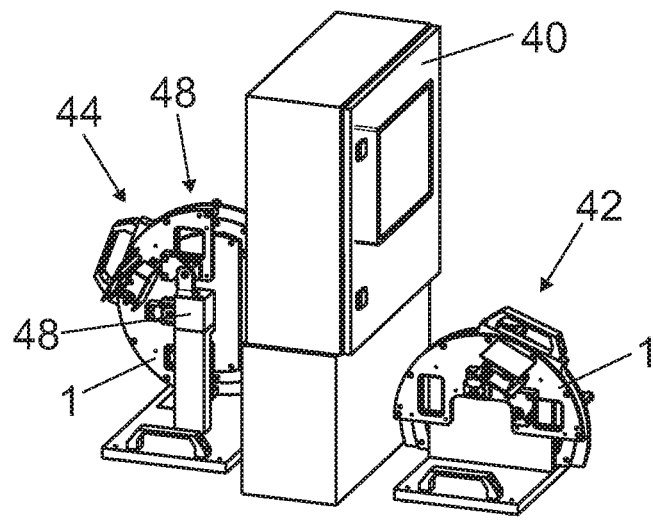
FIG. 5 shows a schematic front view of an embodiment of an apparatus according to the invention for ascertaining a positional deviation of a brake disc, including the evaluation device and the calibrating device.

FIG. 5 shows a schematic front view of an embodiment of an apparatus 1 according to the invention for ascertaining a positional deviation of a brake disc, including the evaluation device 40 and the calibrating device 44. Also shown is a rest position 42 in which the apparatus 1 can be placed safely when no measurement is performed.

The main function of the evaluation device 40 has already been described in connection with the preceding figures. In addition to this, however, in an advantageous embodiment, the evaluation device 40 also performs the calibration of the apparatus 1, which is required in regular intervals in order to be able to always provide an accurate measurement result. For this, the brake disc is replaced with a master adjuster 46 comprising a standardized surface which exhibits either no or a known deviation from the zero line 32 (see FIG. 4), which is inserted and measured by the apparatus 1. The measured values obtained from the distance sensors 20, 22 and 22', respectively, and 24 are used to calibrate the apparatus 1.

Figure 6:
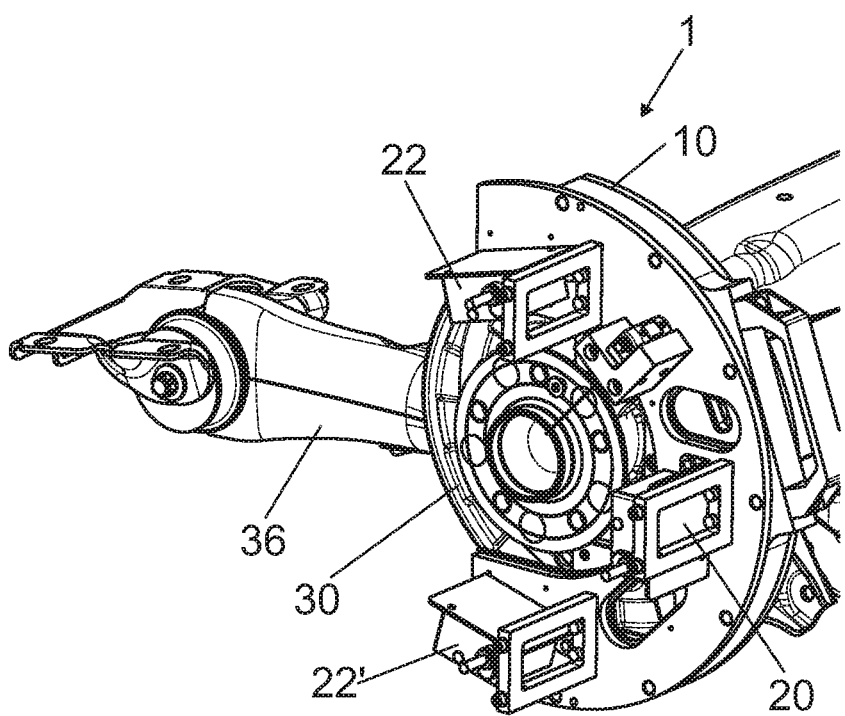
FIGS. 6 and 7 show schematic perspective views of an embodiment of an apparatus according to the invention for ascertaining a positional deviation of a brake disc during use on an axle assembly.
Figure 7:
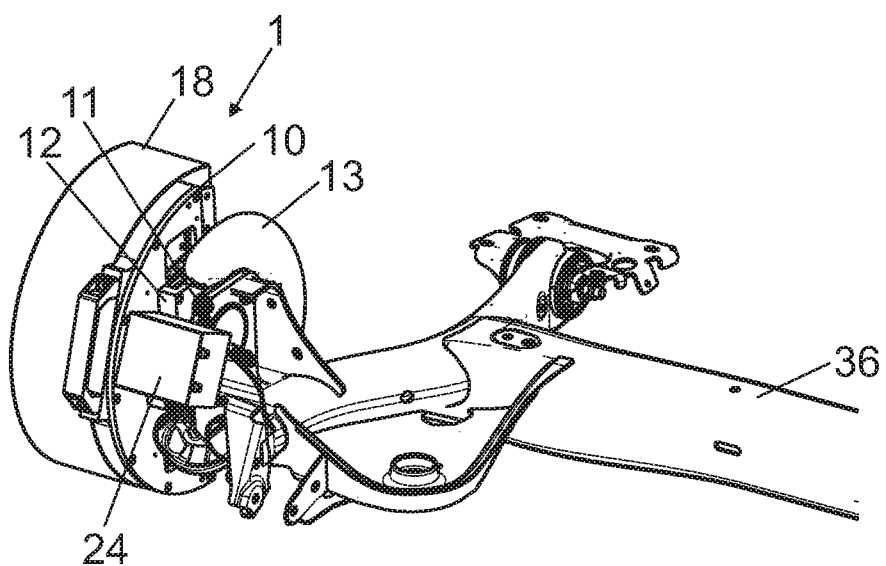

FIGS. 6 and 7 show schematic perspective views of an embodiment of an apparatus 1 according to the invention for ascertaining a positional deviation of a brake disc during use on an axle assembly 36. FIG. 6 illustrates the housing 10 in an open state, thus showing not only the sensors 20, 22 and 22' but also the axle assembly 36. The latter comprises the caliper seat 11, which is not visible here, and to which the housing 10 is screwed. The installed brake disc, which constitutes the brake disc 30, is now rotated about its axis in a defined manner, and the values meanwhile measured by the distance sensors 20, 22 and 22' are transmitted to the evaluation device. Upon evaluation in the evaluation device, axial perpendicularity, disc runout and surface parallelism of the brake disc relative to the caliper seat have been determined, and the ascertained values may be stored in a suitable manner, output or forwarded for further processing.

FIG. 7 shows the same situation but with closed cover 18. Due to the different viewing direction, this figure shows an anchor plate 13, the caliper seat 11 and the connection region 12 of the housing 10, which is connected to the caliper seat.

Figure 8:
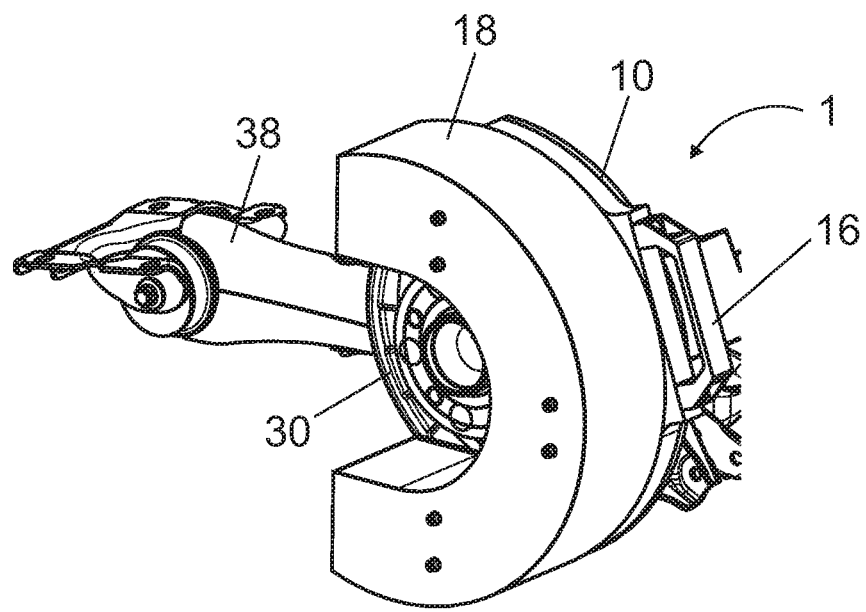
FIGS. 8 and 9 show a schematic perspective view of an embodiment of an apparatus according to the invention for ascertaining a positional deviation of a brake disc at a steering knuckle assembly with closed and open cover, respectively.
Figure 9:
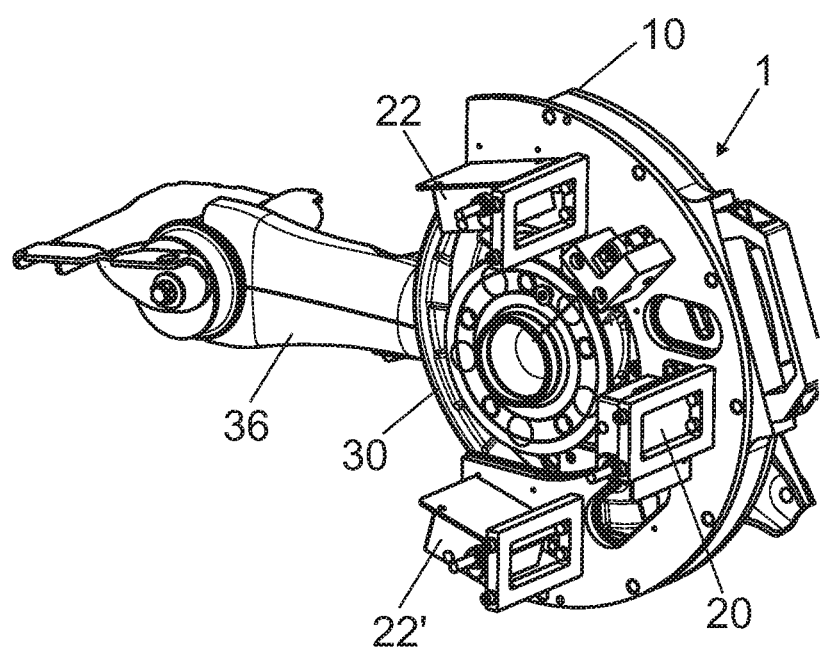

FIGS. 8 and 9 show a schematic perspective view of an embodiment of an apparatus 1 according to the invention for ascertaining a positional deviation of a brake disc at a steering knuckle assembly 38 with closed and open cover, respectively. The steering knuckle assembly 38 likewise comprises a caliper seat for attaching the housing 10 of the apparatus 1 after it has been positioned thereon using the handle 16. Upon attachment, the measurement of the brake disc, i.e. the brake disc 30, can commence. FIG. 9 additionally shows the sensors 20, 22 and 22'.

Figure 10:
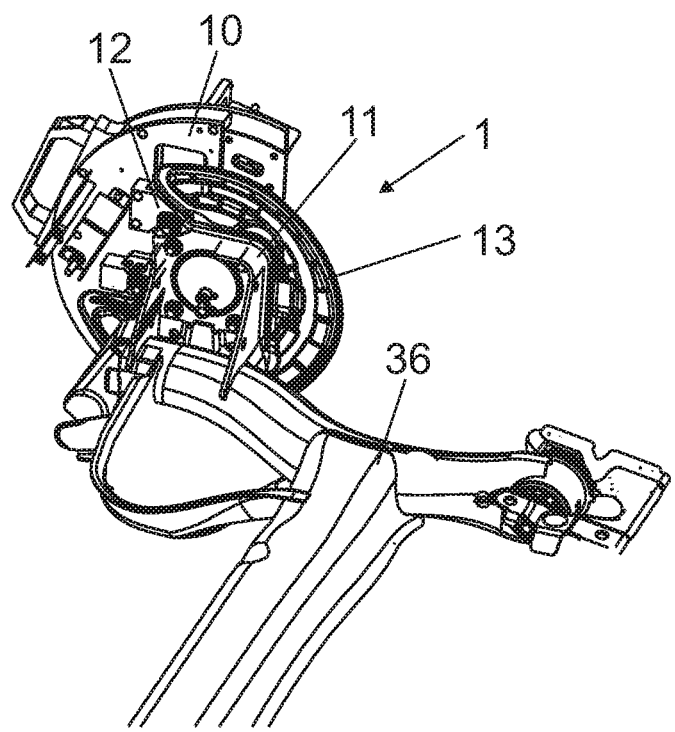
FIGS. 10 and 11 show an axle assembly 36 with an embodiment of an apparatus according to the invention.
Figure 11:
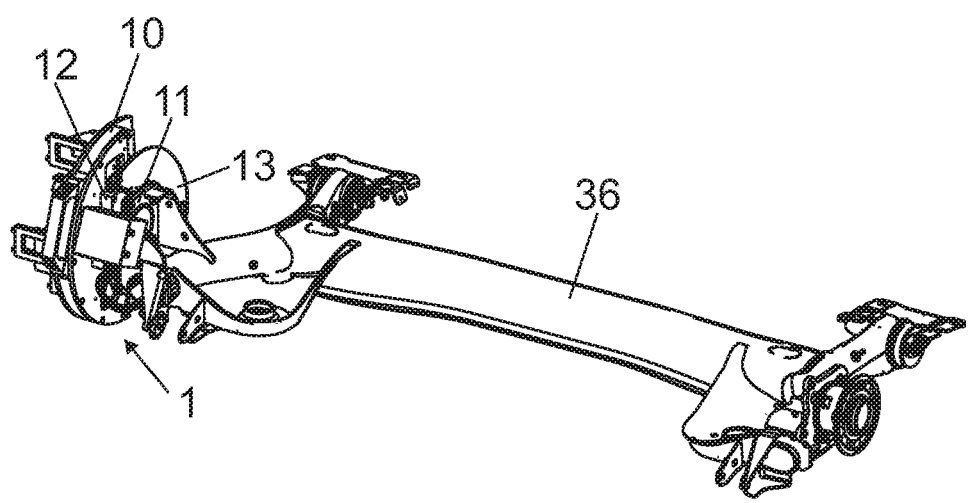

FIGS. 10 and 11 show an axle assembly 36 with the brake disc as brake disc 30 as well as the positioned and attached housing 10 of the apparatus 1. Also shown are the anchor plate 13, the caliper seat 11 and the connection region 12.

Figure 12A:
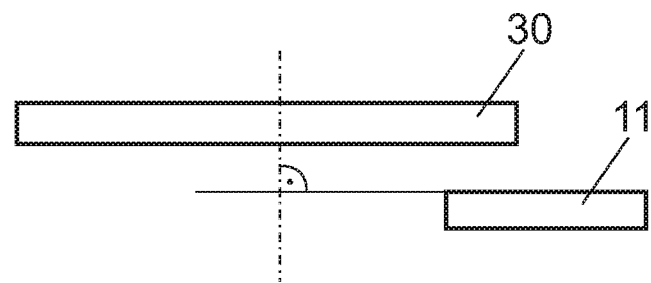
FIGS. 12*a* to 12*c* show a schematic illustration of the positional tolerances in the sense of the present invention: axial perpendicularity, disc runout and surface parallelism.
Figure 12B:
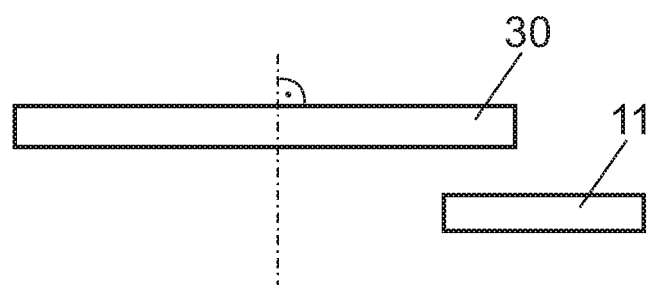
Figure 12C:
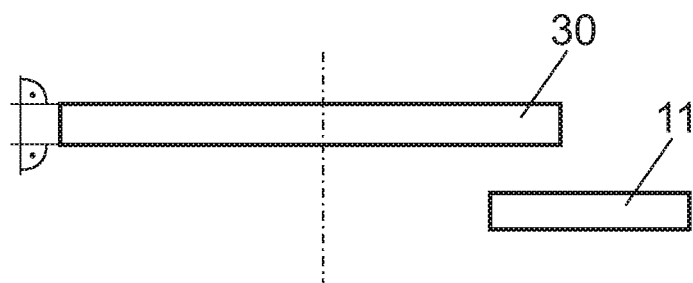

FIGS. 12a to 12c show a schematic illustration of the various positional tolerances that are ascertained according to the present invention. FIG. 12a shows the axial perpendicularity, with the rotation axis of the brake disc 30 running perpendicular to the (extended) caliper seat 11. FIG. 12b shows the disc runout, i.e. the requirement is perpendicularity between the brake disc 30, or its flat faces, and its rotation axis, and deviations result in disc runout. FIG. 12c shows the surface parallelism of the brake disc 30, i.e. parallel orientation of the two flat faces.

LIST OF REFERENCE NUMERALS 1 apparatus
10 housing
11 caliper seat
12 connection region
13 anchor plate
14 sensor holder
15 recess
16 handle
18 cover
20 distance sensor 1
22, 22' distance sensor 2
24 distance sensor 3
26, 26' sensor signal
30 brake disc
32 zero line
34 angular deviation
36 axle assembly
38 steering knuckle assembly
40 evaluation device
42 rest position
44 calibrating device
46 master adjuster
48 connection seat
A, A' distance
MP1 measuring point 1
MP2 measuring point 2
MP3 measuring point 3
R, R' radius

The invention claimed is:

1. A method for ascertaining a positional deviation of a brake disc relative to a caliper seat, characterized in that an angular deviation from the parallel between the brake disc and the caliper seat is measured in that an apparatus for ascertaining the positional deviation of the brake disc, having a housing, is connected to the caliper seat, in an immobile and releasable manner via a connection region of the housing, wherein the housing is carrying at least two distance sensors, so that the orientation of the caliper seat is transmitted via the connection region and the housing to the at least two distance sensors, and their orientation relative to the caliper seat is determined, wherein the at least two distance sensors of the apparatus that are stationary with respect to the caliper seat take measurements in the direction of a first flat face of the brake disc, wherein the at least two distance sensors transmit distances between the first flat face of the brake disc and the at least two distance sensors measured at different radii of the brake disc to an evaluation device, wherein the angular deviation of the brake disc is ascertained by the evaluation device from the distances.

2. The method according to claim 1, wherein the brake disc is rotated about its rotation axis during the measurement, and the angular deviation is ascertained as a function of the respective rotation angle of the brake disc (30) through distances from the brake disc measured during the rotation of the brake disc, wherein an axial perpendicularity and a disc runout are ascertained separately in the evaluation device based on the rotation dependent angular deviation.

3. The method according to claim 1, wherein at least one further distance sensor is provided which is oriented towards a second flat face of the brake disc, so that a surface parallelism of the brake disc is ascertained.

4. The method according to claim 1, wherein at least one distance sensor is provided as a laser measuring sensor.

5. The method according to claim 1, wherein at least one distance sensor is provided as a capacitive proximity sensor.

6. An apparatus for ascertaining a positional deviation of a brake disc relative to a caliper seat, characterized in that a housing of the apparatus is connected to the caliper seat in an immobile and releasable manner via a connection region of the housing, configured for connection to the caliper seat, and at least two distance sensors which are stationary with respect to the caliper seat, wherein the housing is carrying the distance sensors, so that the orientation of the caliper seat is transmitted via the connection region and the housing to the distance sensors, and their orientation relative to the caliper seat is determined, are provided, wherein the distance sensors are arranged at different radii with respect to the rotation axis of the brake disc and are configured for measuring a distance between a first flat face of the brake disc and the distance sensors in the direction of the first flat face of the brake disc, wherein an evaluation device is provided, which is connected to the distance sensors, so that the measured distance is transmitted to the evaluation device and an angular deviation of the brake disc is ascertained from the distance.

7. The apparatus according to claim 6, wherein the brake disc is rotated during the measurement and a rotation angle of the brake disc about its rotation axis is ascertained, and thus a rotation angle dependent change in the angular deviation of the brake disc is ascertained through distances from the brake disc measured during the rotation of the brake disc, wherein the evaluation device is adapted to separately ascertain an axial perpendicularity and a disc runout based on the rotation angle dependent angular deviation.

8. The apparatus according to claim 6, comprising at least one further distance sensor which is oriented towards a second flat face of the brake disc and measures the distance from the second flat face, so that a surface parallelism of the brake disc is ascertained from the measured values of the further distance sensor.

9. The apparatus according to claim 6, wherein at least three distance sensors are provided to act on the first flat face and at least two distance sensors are provided to act on the second flat face of the brake disc.

10. The apparatus according to claim 6, wherein at least one distance sensor is configured as a laser measuring sensor.

11. The apparatus according to claim 6, wherein at least one distance sensor is configured as a capacitive proximity sensor.

12. The apparatus according to claim 6, wherein the brake disc is mounted to a steering knuckle assembly.

13. A calibrating device, comprising a connection seat and a master adjuster which includes a planar surface oriented parallel to the connection seat, wherein the connection seat is connected to an apparatus according to claim 6, and wherein the distance sensors and/or the connected evaluation device is aligned to the planar surface.

14. The apparatus according to claim 6, wherein the brake disc is mounted to an axle assembly.

* * * * *